United States Patent
Leinenbach et al.

(10) Patent No.: US 6,638,710 B2
(45) Date of Patent: Oct. 28, 2003

(54) ADSORBENT FOR REDUCING THE CONCENTRATION OF FIBRINOGEN AND/OR FIBRIN, METHOD OF PRODUCING AN ADSORBER FROM THE ADSORBENT, AND AN ADSORBER WITH THE ADSORBENT

(75) Inventors: Hans-Peter Leinenbach, Tholey (DE); Veit Otto, St. Wendel (DE); Martin Hepper, Neustadt (DE)

(73) Assignee: Fresenius HemoCare GmbH, Bad Homburg (DE)

( * ) Notice: Subject to any disclaimer, the term of this patent is extended or adjusted under 35 U.S.C. 154(b) by 76 days.

(21) Appl. No.: 09/802,776

(22) Filed: Mar. 9, 2001

(65) Prior Publication Data

US 2002/0034723 A1 Mar. 21, 2002

(30) Foreign Application Priority Data

Mar. 9, 2000 (DE) .......................... 100 11 481

(51) Int. Cl.[7] .................. A01N 1/02; B01D 15/00; B01D 39/00; B01D 15/04; B01D 15/08
(52) U.S. Cl. .................. 435/2; 210/198.1; 210/198.2; 210/502.1; 210/656; 210/679; 210/691; 210/692; 210/905
(58) Field of Search .................. 435/2; 210/198.1, 210/198.2, 502.1, 656, 679, 691, 692, 905

(56) References Cited

U.S. PATENT DOCUMENTS 4,144,388 A * 3/1979 Yatsu et al.
4,883,598 A * 11/1989 Riethorst et al.
5,476,715 A * 12/1995 Otto

FOREIGN PATENT DOCUMENTS

| EP | 0 303 329 | | 2/1989 |
| EP | 0434354 A1 | * | 6/1991 |
| EP | 0434954 | * | 6/1991 |
| EP | 0858831 | * | 8/1998 |
| JP | 000 2036199 | | 2/1990 |

OTHER PUBLICATIONS

Sigma Chemical Company, Biochemicals and Organic Compounds for Research and Diagnostic Reagebts.1974, pp. 1674–1675.*

Spraycar, M. et al (Eds)., Stedmans Medical Dictionary, 1995, Williams and Wilkins, Baltimore, 26th edition, p. 67.*

J. Fadul et al., "Reduction of Plasma Fibrinogen, Immunoglobulin G, and Immunoglobulin M Concentrations by Immunoadsorption Therapy with Tryptophan and Phenylalanine Adsorbents," Artificial Organs, vol. 20, No. 9, 1996, pp. 986–990.

* cited by examiner

Primary Examiner—Jon P. Weber
Assistant Examiner—Kailash C. Srivastava
(74) Attorney, Agent, or Firm—Kenyon & Kenyon

(57) ABSTRACT

An adsorbent for reducing the concentration of fibrinogen and/or fibrin in blood or blood plasma comprises a matrix and synthetic lateral chains that are covalently bonded to the matrix. The lateral synthetic chains are comprised of at least two amino groups in which the $N_2$ atoms are at least 2.6 Å apart within at least one lateral synthetic chain. The matrix exhibits porous, unaggregated, spherical particles in a range of particle sizes from 50 to 250 µm, which possess an exclusionary threshold of at least $10^7$ Daltons, and they exhibit no peptides or aromatic groups of any kind. The at least two amino groups are preferably separated from one another by 4 to 6 carbon atoms. An adsorber for the purpose of reducing the concentration of fibrinogen and/or fibrin in blood or blood plasma may be produced from the adsorbent.

23 Claims, No Drawings

ADSORBENT FOR REDUCING THE CONCENTRATION OF FIBRINOGEN AND/OR FIBRIN, METHOD OF PRODUCING AN ADSORBER FROM THE ADSORBENT, AND AN ADSORBER WITH THE ADSORBENT

FIELD OF THE INVENTION

The present invention relates to an adsorbent for the purpose of reducing the concentration of fibrinogen and/or fibrin in blood or blood plasma, comprising a matrix and synthetic lateral chains covalently bonded to the matrix having at least two amino groups whose nitrogen atoms, in the chain, are removed at least 2.6 Angstroms (0.26 nm) from one another, such that the synthetic lateral chains are peptide-free and exhibit no aromatic groups. Furthermore, the invention relates to a method of producing an adsorber from the adsorbent for the purpose of reducing the concentration of fibrinogen and/or fibrin in blood or blood plasma, as well as the adsorber itself.

BACKGROUND OF THE INVENTION

Adsorbents are widespread in medical technology. Adsorbers with adsorbents that remove lipoproteins of low density (LDL) from blood, or rather, reduce their concentration, such as those known from German Patent No. 39 32 971, are frequently described. German Patent No. 39 32 971 describes the adsorber material as an organic carrier having a fixed particle size and exclusionary threshold, which bears a ligand on its surface, to which the LDL molecule bonds.

In German Patent No. 197 29 591, the use of a ligand for fibrinogen and/or fibrin is claimed in order to cure the diseases engendered on the basis of an excessively elevated proportion of fibrinogen in the blood, or to at least prevent such diseases. In the process described in German Patent No. 197 29 591, the ligand is defined as a substance that binds, specifically, to fibrinogen and/or fibrin, and is, preferably, a peptide with three to ten amino acids.

The reduction of concentrations of plasma fibrinogen, immunoglobulin G (IgG) and immunoglobulin M '(IgM)' by means of immunoadsorption therapy with tryptophan or phenylalanine adsorbents is known from *Artificial Organs*, volume 20, No. 9 (1996), pp. 986–990. In immunoadsorption therapy, adsorption columns are used which exhibit spherical polyvinyl alcohol (PVA) gel particles as carriers. On their surfaces, the PVA gel particles carry either tryptophan or phenylalanine as an amino acid ligand, which is covalently bonded to the PVA by way of spacers. The plasma, which is separated from blood cells, is conducted via the adsorption column and thereafter, before being led back to the patient, reunited with the blood cells again. With this immunoadsorption therapy, simultaneously, the concentrations of fibrinogen, IgG and IgM are significantly reduced.

Even if adsorption has, in the meantime, made its way into the clinical routine as a means of ameliorating illnesses, increasing demands are being made regarding the selectivity of adsorption. In other words, although the adsorbers are not permitted to adsorb any proteins that are necessary for human beings, or rather, as few of them as possible, it is also desirable that the reduction of the concentration of harmful proteins be so great that the extra-corporal treatment, which is a burden to the patient, is as effective as possible.

It has been known for some time that a number of diseases are based upon a lack of micro-circulation of the blood. The diseases enumerated in Table 1, which follows below, could be mentioned by way of example.

TABLE 1

CNS:

Stroke
TIA (Transient Ischemic Attack)
PRIND (Prolonged Reversible Ischemic Neurological Deficit)
Chronic vascular diseases of the CNS
Chronic intracranial perfusion disorders
Chronic extracranial perfusion disorders
Cerebro-vascular perfusion disorders
Dementia
Alzheimer's disease
Severe central vertigo Eye:

Chronic perfusion disorder
Acute vascular occlusion

Ear:

Sudden deafness
Vertigo emanating from inner ear
Méniere's disease

Lung:

Primary pulmonary hypertension
Veno-occlusive lung diseases
Thrombotic primary pulmonary hypertension
Thromboembolitic diseases of the major vessels Heart:

Transplant vasculopathies
Acute myocardial infarction
Unstable angina pectoris
Small vessel disease of the heart
Inoperable severe coronary heart disease
Cardiomyopathies Abdomen:

Angina abdominalis

Kidneys:

Renal vasculopathies
Glomerulonephritides
Chronic renal insufficiency
Peripheral arterial occlusion diseases
Acute vascular occlusions
Vasculitides
Septic shock
Disseminated intravascular coagulation (DIC) of different origin, e.g. in tumors
Type I + II diabetes
Diabetic retinopathy
Diabetic neuropathy
Diabetic nephropathy Thus far, these diseases have been treated with medications, for the most part, and in the process, nothing more than an elimination of the symptoms has occurred. The measures that have been known thus far for treating and influencing the micro-circulation and the rheology of the blood consist of plasma exchange, heparin-induced extra-corporal LDL cholesterol precipitation (HELP) and the adsorption of fibrinogen with the aid of a ligand, to which fibrin and/or fibrinogen specifically binds. The use of a ligand of that type is described in German Patent No. 197 29 591. Peptides that exhibit, preferably, three to ten amino acids, such that the particularly preferred sequence is said to be glycine-proline-arginine-proline-X, are cited as ligands.

The synthetic production of peptides, however, is a complex and costly process, so that the use of a specific adsorber as a ligand is very costly.

Beyond that, peptides longer than a certain length trigger antibody reactions so that after repeated use, pronounced immune reactions can result in the long term. Indeed, in order to reduce the immune defense, peptide oligomers that are as short as possible are used, but immunogenicity can never be fully precluded. In addition, leakage, an unnoticed release of pieces of peptide, is particularly dangerous, because as components of the body's inherent structures, peptides represent bioactive molecules.

In addition, as described in *Artificial Organs*, volume 20, No. 9 (1996), pp. 986–990, immunoadsorption therapy employs the amino acids tryptophan or phenylalanine for bonding onto the PVA gel particles, and therefore, it too is complicated and costly. Furthermore, with this therapy, even substances that should not be removed from the plasma, such as IgG and IgM, are removed from the plasma in amounts that are comparable to those of the fibrinogen.

SUMMARY OF THE INVENTION

The object of the present invention is to create an adsorbent for the purpose of reducing the concentration of fibrinogen and/or fibrin in blood or blood plasma that exhibits better elimination ratios and can be produced more cost-effectively than those adsorbents known in the art, while at the same time being bio-compatible, possessing selectivity for fibrinogen and/or fibrin, and causing no immune defense.

It has been surprisingly discovered herein that an adsorbent that exhibits a matrix and synthetic lateral chains that are covalently bonded to the matrix, such that the lateral chains contain at least two amino groups that are spatially separated from one another, causes such a distinct reduction of the fibrinogen level that following treatment, microcirculation is improved.

DETAILED DESCRIPTION

According to the present invention, the spatial distance of the amino groups is important for the capacity to bind, as it must be at least 2.6 Angstroms (0.26 nm). If the amino groups are farther than ten atoms removed from one another, the atoms being selected from the group of carbon, oxygen, sulfur, and/or phosphorous, such that the atoms are, preferably, carbon atoms, the binding effect is reduced once more. In the process, the atoms can consist of just one type of atom, however, any combination of the aforementioned types of atoms is possible. If the amino groups are less than four atoms removed from one another, then the lateral chain becomes more unstable chemically. For this reason, a chain length of four to six atoms, preferably carbon atoms, is preferred between the amino groups.

The possibility of being sterilized, especially the possibility of being sterilized by means of heat, is important for the use of such an adsorbent, due to the fact that the treated blood is to be returned to the patient, and it must not trigger any sepsis or inflammations. The peptides and amino acids currently used in the art are not thermally or chemically stable, in contrast to the matrix according to the present invention, which is preferably an organic matrix, and which exhibits stable lateral chains. Therefore, the synthetic lateral chains, which are according to the present invention covalently bonded to the matrix, are completely free of peptides.

It has been surprisingly discovered herein that the reduction of the concentration of fibrinogen is lessened if carbonyl groups or carboxyl groups are found in the immediate vicinity of the amino group(s). Evidently, the capacity of the lateral chains that exhibit the amino groups to bind to the fibrinogen and/or fibrin is limited by the presence of carbonyl or carboxyl groups. For these reasons, the synthetic lateral chains that are covalently bonded to the matrix according to the present invention are preferably totally free of carbonyl and carboxyl groups. In addition, it has been found that the presence of aromatic groups in the lateral chains influences the binding capacity unfavorably, and even the selectivity of the adsorbent with respect to fibrinogen and/or fibrin is diminished. For this reason, the covalently bonded, synthetic lateral chains of the adsorbent according to the present invention exhibit no aromatic groups.

The expression "synthetic" that is employed herein means that no biological material, especially no peptides, i.e., no dipeptides, tripeptides, oligopeptides, polypeptides, proteins (macropeptides), not even those that were produced synthetically, is used to introduce the lateral chains to the matrix.

Beyond that, the adsorbent according to the present invention is biocompatible. In principle, several carrier substances are conceivable as a matrix, such as, for example, glass, carbohydrates, sepharose, silica, or organic matrices, such as copolymers of acrylates or methacrylates, as well as polyamides. Preferably, the matrix consists of organic material, and copolymers that are derived from (meth)acrylates and/or (meth)acrylic acid amides are especially preferred. These matrices exhibit epoxide groups, preferably. The term "(meth)acrylic" is taken to mean both the corresponding acrylic as well as the methacrylic compounds.

Most preferred as a matrix for the adsorbent according to the present invention is a statistical copolymer produced by the polymerization of the monomeric units:

(A) (Meth)acrylamide, in a quantity of 10 to 30% by weight;

(B) N,N'-methylene-bis(meth)acrylamide, in a quantity of 30 to 80% by weight; and (C) Allyl glycidyl ether and/or glycidyl-(meth)acrylate in a quantity of 10 to 20% by weight, relative to the total weight of the monomeric units, in each case.

The copolymer is preferably produced by means of suspension polymerization. Such a copolymer is commercially available from Röhm GmbH [Ltd.] under the designation Eupergit C250L or Eupergit FE162.

When using the aforementioned copolymer or another organic matrix that contains the oxirane groups (epoxide groups), such as, for example, a copolymer, which is also preferred within the context of the present invention, obtained by means of suspension polymerization of ethylene glycol dimethacrylate and glycidyl methacrylate and/or allyl glycidyl ether, these oxirane groups are aminated, preferably with ammonia or a primary amine, prior to the introduction of the synthetic lateral chains, which are to be bonded on covalently. Ammonia is preferred for this process out of logistical and cost concerns.

The matrix is then made to react with one or more compounds so that in the end result, a lateral chain is obtained which exhibits at least two amino groups whose nitrogen atoms are arranged in the chain at a distance of at least 2.6 Angstroms (0.26 nm) from each other. In the case of a matrix that has already been aminated or a matrix that already contains amino groups, a compound having one amino group, such as ethanol amine for example, is sufficient for this purpose.

The matrix can be present in the form of spherical, unaggregated particles, so-called beads, fibers, or a membrane, such that a porosity of the matrix increases the surface area. The porosity can be enhanced, for example, by the addition of pore-forming substances, such as cyclohexanol or 1-dodecanol, to the reaction mixture of the suspension polymerization. It is advantageous, furthermore, if the matrix possesses an exclusionary threshold of at least 10⁷ Dalton, so that the fibrinogen can penetrate the pores with the plasma, in order to make its way to the lateral chains, which contain the amino groups.

Another advantageous embodiment of the present invention lies in the notion of using the adsorber according to the present invention in whole blood by means of the suitable selection of the carrier matrix. To this end, the matrix consists of unaggregated, spherical particles in a range of particle sizes extending from 50 to 250 μm, and it possesses an exclusionary threshold of at least 10⁷ Dalton. As a result, blood cells can come into contact with the adsorber material without clogging the column or the retention or aggregation of an unreasonable number of cells. This is rendered possible by the size and spherical form of the beads in conjunction with the exclusionary threshold in the case of the adsorbent according to the present invention, due to the fact that the cells glide along the smooth outer surface of the beads, as a result of which only slight thrombocytic adhesion occurs and the plasma with the fibrinogen nevertheless has the opportunity of penetrating into the pores.

As a result, extra-corporal steps are eliminated, such as the removal of blood cells, the treatment of the isolated plasma and the combination of the blood components, as a result of which the biocompatibility of the process is enhanced; for example, the danger of a complementary activation is further diminished to a considerable degree. The elimination of extra-corporal steps causes a shortening of treatment time and a simplification of the process, as a result of which an enhancement of patient safety and well-being is achieved.

An adsorber that is equipped with the adsorbent according to the present invention exhibits a housing, which is embodied, preferably, in tubular or columnar form, which also contains the adsorbent as filler material. With respect to the customary amount of blood or blood plasma that is to be put through the adsorber, and the efficiency of the adsorber, according to the present invention the adsorber comprises, preferably, a volume of 250 to 1250 ml. The adsorber can be used individually, or in dual or multiple operation. In the case of two or more adsorbers, there is the possibility of alternately supplying an adsorber with blood or blood plasma while the other adsorber is regenerated. This leads to a further efficiency when using the adsorber according to the present invention. The adsorber is preferably embodied in such a way that it exhibits a housing with an inlet zone on the same side as the head, through which the blood or blood plasma is led to the adsorber, such that in this case, the outlet is found at the bottom of the housing.

In order to prevent undesired substances, such as, for example, substances that originate from the adsorbent material, from being led back to the patient's circulatory system with the treated blood or blood plasma, a filter is found, preferably on the outlet of the adsorber's housing. Preferably, this filter is a particle filter.

Three types of the introduction of synthetic lateral chains with two amino groups, which are covalently bonded to the matrix, whose nitrogen atoms in the chain are at least 2.6 A removed from one another in the chain, are described in the following examples.

EXAMPLE 1

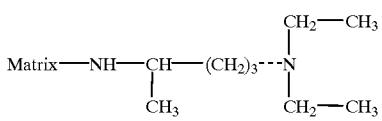

The 2-amino-5-diethylaminopentane (Sigma-Aldrich, Lot No. 50619011) was bonded to Eupergit C 250 L (Röhm GmbH, Lot No. 1690419573).

Eupergit's oxirane group content is always determined— as was suggested by the manufacturer—by way of back titration with sodium thiosulfate. The amount of Eupergit that was weighed in, 5 g dry weight, is washed with 50 ml of phosphate buffer (0.1 M, pH 6.8) and after the addition of the amount of coating solution that is equimolar to the oxirane content (2-amino-5-diethylaminopentane in 0.1 M phosphate buffer, 0.15 M NaCl, 0.02% NaN₃), incubated for 72 hours on the roller mixer at room temperature. The adsorbent is washed with physiological saline solution and with the addition of 0.02% NaN₃, is stored in it.

EXAMPLE 2

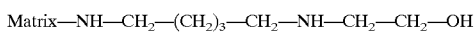

Ethanol amine (Fluka, Lot No. 369736/1-23597) was bonded, via glutaric dialdehyde (Fluka, Lot No. 369366/1) to previously aminated Eupergit C 250 L (Röhm GmbH, Lot No. 1690419573).

100 ml of 12.5% ammonia are added per 10 g dry weight of Eupergit and incubated for 4 hours on the tumbler at room temperature, then washed 10 times with 200 ml of distilled water in each case. Twice in each case 40 ml 0.4% glutaric dialdehyde solution in phosphate buffer are incubated for 2 hours each with the aminated Eupergit at 40° C. The adsorbent is washed 10 times with 100 ml of distilled water. After adding an amount of coating solution that is equimolar to the content of the oxirane group (ethanol amine in 0.1 M phosphate buffer, 0.15 M NaCl, 0.02% NaN₃), incubation proceeds for 72 hours at room temperature on the roller mixer. After equilibration with 50 ml of phosphate buffer in each case, the adsorbent is reduced overnight at 4° C. by the addition of 50 ml of 5 mM ascorbic acid in 6.8 pH phosphate buffer. The adsorbent was washed with physiological saline solution and stored in it, 0.02% NaN₃ having been added.

EXAMPLE 3

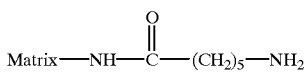

6-aminohexanoic acid (Merck, Lot No. 5214629), after activation with carbodiimide (EDC Aldrich, Lot No. 05503-125) was also bonded to previously aminated Eupergit C 250 L (Röhm GmbH, Eupergit Lot No. 0480619145).

10 g of Eupergit are aminated and then washed as described. After the addition of 10 ml EDC solution (4% in physiological NaCl) and 100 ml of 6-aminohexanoic acid solution (0.3 M in 0.1 M phosphate buffer, pH 6.8), incubation takes place on an agitator at room temperature for 4 hours, and then it is stored at 4° C. overnight. The reaction mixture is then washed 10 times with 200 ml of distilled water in each case, and stored in physiological saline solution with 0.02% sodium azide.

The adsorbents that are obtained in this way were tested in a batch process for their property to bind to fibrinogen. For this purpose, in each case, 5 ml of human plasma which had undergone anticoagulation with citrate in a ratio of 20:1, were incubated with 1 g (wet weight) of adsorbent for 1 hour at room temperature on a roller mixer. Both prior to and following incubation, the fibrinogen content was determined in the supernatant turbidimetrically according to the CLAUSS method (Clauss, A., Quick clotting physiology method for determining fibrinogen: Acta Haernatologica (1957) 17, 237–246) on a coagulometer (BCS, blood-cell separator made by the firm of Behring). The binding capacity is derived from differences between preliminary values and values after the incubation. In all examples, the initial fibrinogen concentration was 3.33 mg/ml of plasma.

In the following graph, the reduction of fibrinogen in the examples cited, compared with the peptide ligands known in the state of the art, is depicted. In the process, the peptides were directly coupled to Eupergit C 250 L (Röhm GmbH, Lot No. 1690419573).

The Eupergit is washed with phosphate buffer in the manner described above and incubated for 72 hours at room temperature on the roller mixer through the addition of coating solution (equimolar quantities of peptide to oxirane groups in 0.1 M phosphate buffer, 0.15 M NaCl, 0.02% NaN$_3$). Then, washing with physiological saline solution occurs, and storage under sodium azide occurs.

The following diagrams illustrate the binding capacity of the individual gels in mg of Fibrinogen/ml Gel:

EXAMPLE 1

2-Amino-5-diethylaminopentane (ADEAP)

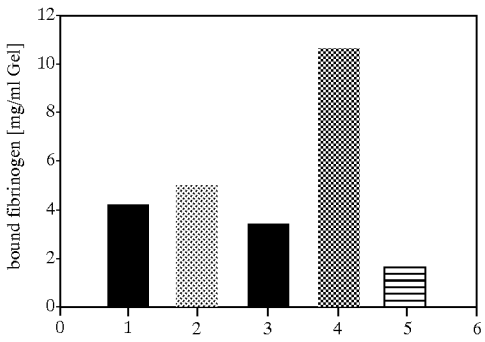

EXAMPLE 2

Ethanolamine

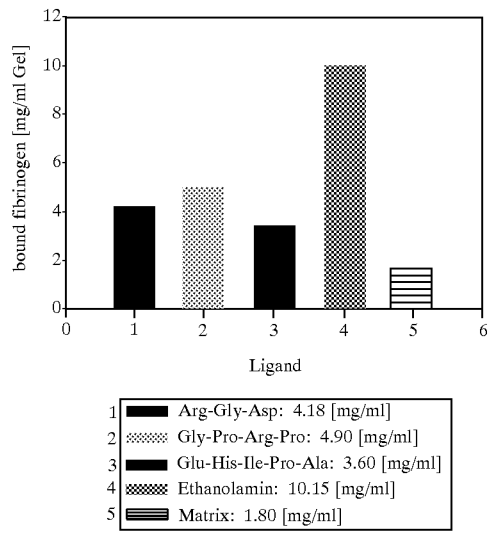

EXAMPLE 3

6-Aminohexanoic Acid

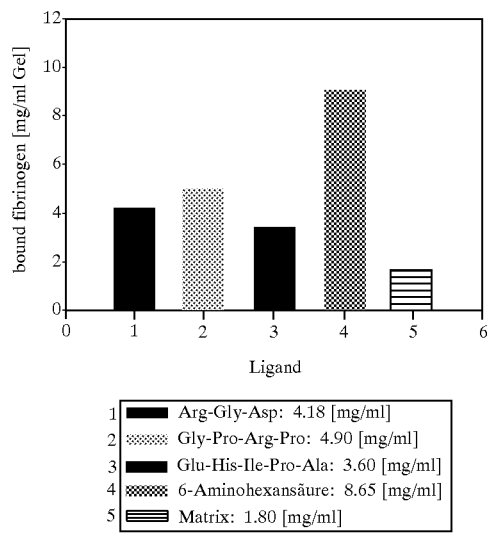

What is claimed is:
1. An adsorbent for reducing the concentration of at least one of fibrinogen and fibrin in blood or blood plasma, comprising:
   a matrix; and
   at least one synthetic lateral chain covalently bonded to the matrix and containing at least two amino groups whose nitrogen atoms are at least 2.6 Å removed from one another within the at least one synthetic lateral chain, wherein the at least two amino groups are separated from each other by between one and four atoms, and wherein the at least one synthetic lateral chain is peptide-free and contains no aromatic groups.
2. The adsorbent of claim 1, wherein the at least two amino groups are separated from each other by four atoms.

3. The adsorbent of claim 1, wherein the between one and four atoms is selected from the group consisting of carbon, oxygen, sulfur and phosphorous.

4. The adsorbent of claim 1, wherein each atom is a carbon atom.

5. The adsorbent of claim 1, wherein the matrix is an organic matrix.

6. The adsorbent of claim 5, wherein the organic matrix comprises a copolymer derived from at least one of (meth)acrylates and (meth)acrylic acid amides.

7. The adsorbent of claim 6, wherein the copolymer contains epoxide groups.

8. The adsorbent of claim 6, wherein the copolymer is a statistical copolymer produced by the polymerization of the monomeric unit of (meth)acrylic amide in a quantity of 10 to 30% by weight, the monomeric unit of N,N'-methylene-bis(meth)acrylamide in a quantity of 30 to 80% by weight, and at least one of the monomeric units of allyl glycidyl ether and glycidyl-(meth)acrylate in a quantity of 10 to 20% by weight, wherein the percentages by weight are relative to the total weight of all of the monomeric units.

9. The adsorbent of claim 7, wherein the epoxide groups were aminated with ammonia or with a primary amine prior to the introduction of the at least one synthetic lateral chain.

10. An adsorbent for reducing the concentration of at least one of fibrinogen and fibrin in blood or blood plasma, comprising:

a matrix; and at least one synthetic lateral chain covalently bonded to the matrix and containing at least two amino groups whose nitrogen atoms are at least 2.6 Å removed from one another within the at least one synthetic lateral chain, wherein the at least one synthetic lateral chain is peptide-free and contains no aromatic groups, wherein the at least one synthetic lateral chain is 2-amino-5-diethyl aminopentane.

11. The adsorbent of claim 9, wherein the at least one synthetic lateral chain was obtained as a result of the reaction of the organic matrix with either ethanol amine or with 6-aminohexanoic acid.

12. The adsorbent of claim 1, wherein the at least one synthetic lateral chain contains no carbonyl or carboxyl groups.

13. The adsorbent of claim 5, wherein the organic matrix comprises spherical, unaggregated particles.

14. The adsorbent of claim 13, wherein the spherical, unaggregated particles have a particle size of 50 to 250 µm.

15. The adsorbent of claim 14, wherein the spherical, unaggregated particles are porous, and the organic matrix has an exclusionary threshold of at least $10^7$ Dalton.

16. The adsorbent of claim 1, wherein the adsorbent is biocompatible.

17. The adsorbent of claim 1, wherein the adsorbent is compatible with whole blood.

18. A method of producing an adsorber for the purpose of reducing the concentration of at least one of fibrinogen and fibrin in blood or blood plasma, said method comprising:

adding an adsorbent to a housing to form an adsorber, wherein the adsorbent comprises:

a matrix; and at least one synthetic lateral chain covalently bonded to the matrix and containing at least two amino groups whose nitrogen atoms are at least 2.6 Å removed from one another within the at least one synthetic lateral chain, wherein the at least two amino groups are separated from each other by between one and four atoms, and wherein the at least one synthetic lateral chain is peptide-free and contains no aromatic groups.

19. An adsorber for the purpose of reducing the concentration of at least one of fibrinogen and fibrin in blood or blood plasma, comprising:

a housing; and an adsorbent contained by the housing, wherein the adsorbent comprises:

a matrix; and at least one synthetic lateral chain covalently bonded to the matrix and containing at least two amino groups whose nitrogen atoms are at least 2.6 Å removed from one another within the at least one synthetic lateral chain, wherein the at least two amino groups are separated from each other by between one and four atoms, and wherein the at least one synthetic lateral chain is peptide-free and contains no aromatic groups.

20. The adsorber of claim 19, wherein the adsorber has a volume of 250 to 1250 ml.

21. The adsorber of claim 19, the adsorber further comprising:

a head on the housing;

an inlet zone on the same side as the head; and an outlet zone on the opposite side as the head.

22. The adsorber of claim 21, further comprising a filter in the outlet zone.

23. The adsorber of claim 22, wherein the filter is a particle filter.

* * * * *